United States Patent Office 2,828,327
Patented Mar. 25, 1958

2,828,327

ESTERS OF N-AROYLASPARTIC ACIDS

Joachim Dazzi, Dayton, Ohio, assignor to Monsanto Chemical Company, St. Louis, Mo., a corporation of Delaware No Drawing. Application December 17, 1953
Serial No. 398,862

3 Claims. (Cl. 260—471)

This invention relates to esters of N-aroylaspartic acids and to vinyl chloride polymers plasticized with the aspartates.

The new aspartates which I have found to possess high efficiency when employed as plasticizers for vinyl chloride polymers have the formula

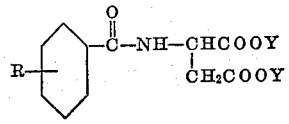

in which R is selected from the class consisting of hydrogen and alkyl radicals of from 1 to 4 carbon atoms and Y is an alkyl radical of from 4 to 12 carbon atoms. As illustrative of aspartates having the above formula may be mentioned: dibutyl or diisobutyl N-benzoylaspartate, diamyl N-4-toluylaspartate, di-n-hexyl N-(3-ethylbenzoyl)aspartate, dihexyl N-benzoylaspartate, bis(2-ethylhexyl) N-(2-isopropylbenzoyl)aspartate, dinonyl N-(4-butylbenzoyl)aspartate, didecyl N-benzoylaspartate, didodecyl N-4-toluylaspartate, etc.

The present N-aroyl aspartates are prepared according to the present invention by contacting an appropriate N-aroylaspartic acid or an acid halide thereof such as the chloride or the bromide, with an unsubstituted, aliphatic saturated alcohol of from 4 to 12 carbon atoms, preferably in the presence of an esterifying agent. The N-aroylaspartic acids are obtainable by various known methods. I have found it most feasible to prepare these acids by condensation of aspartic acid with an aroyl halide, the halide preferentially condensing at the amino group of the aspartic acid rather than at the carboxylic group.

N-aroylaspartic acids or the acyl chlorides, bromides or iodides thereof which are useful in the preparation of the present esters have the formula

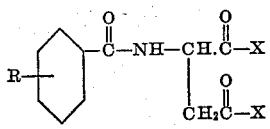

in which X is selected from the class consisting of —OH, Cl, I and Br and R is selected from the class consisting of hydrogen and an alkyl radical of from 1 to 4 carbon atoms. As illustrative of acids and acyl halides having the above formula may be mentioned: N-benzoylaspartic acid, N-benzoyl N-aspartoyl chloride, 4-toluyl aspartic acid, N-(2-ethylbenzoyl)aspartoyl bromide, N-(4-isopropylbenzoyl)aspartic acid, N-(3-n-propylbenzoyl)aspartoyl iodide, N-(4-isobutylbenzoyl)aspartic acid, etc.

Unsubstituted, aliphatic saturated alcohols of from 4 to 12 carbon atoms used in the condensation reaction with the above mentioned acids or acyl halides in the preparation of the present esters are, e. g., n-butyl, tert-butyl, isoamyl, n-hexyl, n-heptyl, 2-ethylhexyl, n-octyl, n-nonyl, n-decyl, n-undecyl, n-dodecyl, and 2-butyl octyl alcohols. Mixtures of the alcohols may be used to obtain a mixture of esters; also, mixed esters, for example, butyl dodecyl N-benzoylaspartate or amyl octyl N-4-toluylaspartate are obtained by forming a half ester with one alcohol and then completing the esterification with another of these alcohols. Technical mixtures of branched-chain alcohols obtainable for example by the "Oxo" process or by hydrogenation of technical mixtures of higher fatty acids may also be used as the alcohol component in the preparation of the present esters.

Esterifying catalysts generally useful in the present process are acidic or alkaline materials generally, e. g., 4-toluenesulfonic acid, sulfuric acid, pyrophosphoric acid, hydrochloric acid, sodium methoxide, etc.

In preparing the present dialkyl N-aroylaspartates I prefer to operate substantially as follows: The N-aroylaspartate or an acyl halide thereof is mixed with the appropriate alcohol or mixture of alcohols and an esterifying catalyst in the presence or absence of an inert solvent or diluent, and the resulting mixture is allowed to stand at ordinary or increased temperatures until formation of the ester is substantially completed. Completion of the reaction may be readily ascertained by noting the quantity of water or hydrogen halide evolved in the reaction. The temperature employed in the reaction varies with the individual nature of the reactants as well as with other reaction conditions such as degree of stirring, reactant quantity, etc. In most instances I have found it to be advantageous to heat the reaction mixture at a temperature of, say, from 50° C. to the refluxing temperature of the reaction mixture. When operating in the presence of a diluent, refluxing temperatures appear to give optimum yields. Inert solvents or diluents useful in the present process are liquid aliphatic or aromatic hydrocarbons or the chloro or nitro derivatives thereof, such as benzene, hexane, kerosene, hexachloroethane, 1,2-dichlorobenzene, or nitrobenzene. High boiling ethers such as dioxane are also useful.

The present higher alkyl esters may also be prepared by an interchange reaction whereby a lower dialkyl ester of the N-aroylaspartic acid, for example, the dimethyl ester is reacted with an unsubstituted, aliphatic saturated alcohol of from 4 to 12 carbon atoms in the presence of the esterifying catalyst. In both procedures, the formation of the present esters occurs to some extent at ordinary room temperatures; for good yields of the desired products, however, I prefer to operate at refluxing temperatures while removing from the reaction zone either the water or hydrogen halide which is given off during the direct esterification or the lower alcohol generated in the interchange reaction.

Dialkyl esters of N-aroylaspartic acids in which the alkyl groups have from 4 to 12 carbon atoms are highly efficient plasticizers for vinyl chloride polymers. A wide variety of plasticizers has been employed for the purpose of improving the physical properties of vinyl chloride polymers. Particular attention has been given to the improvement of flexibility and heat and light stability of such plasticized compositions. In many instances the improvement in flexibility has been obtainable only by sacrificing other properties of an ideal polyvinyl chloride composition, such as low volatility, color and heat stability, water absorption, etc. I have found that very good flexibility, without sacrifice of temperature stability and low volatility, is imparted to vinyl chloride polymers when the new aspartates are employed as plasticizers for such polymers.

The present esters are valuable plasticizers for polyvinyl chloride and copolymers of at least 70 percent by weight of vinyl chloride and up to 30 percent by weight of an unsaturated monomer copolymerized therewith, for example vinyl acetate, vinylidene chloride, etc. I have found these esters serve not only to soften vinyl chloride polymers, but also to impart simultaneously a high degree of low temperature flexibility, very good temperature stability and great mechanical strength to these polymers. The present esters are compatible with vinyl chloride polymers and show no exudation of plasticizers even at plasticizer content of up to 50 percent. Although the quantity of plasticizer will depend upon the particular polymer to be plasticized and upon its molecular weight, it is generally found that compositions having from 5 percent to 50 percent by weight of plasticizer will, in most cases, be satisfactory for general utility. The good flexibility of the plasticized compositions increases with increasing plasticizer concentration.

In evaluating plasticizer efficiency use is made of the following empirical testing procedures:

*Compatibility.*—Visual inspection of the plasticized composition is employed, incompatibility of the plasticizer with the polymer being demonstrated by cloudiness and exudation of the plasticizer.

*Hardness.*—A standard instrument made by the Shore Instrument Company is used for this determination and expresses the hardness in units from one to 100. The hardness of a composition is judged by its resistance to the penetration of a standard needle applied to the composition under a standard load for a standard length of time.

*Low temperature flexibility.*—Low temperature flexibility is one of the most important properties of elastomeric vinyl compositions. While many plasticizers will produce flexible compositions at room temperature the flexibility of these compositions at low temperatures may vary considerably, i. e., plasticized polyvinyl chloride compositions that are flexible at room temperature often become very brittle and useless at low temperatures. Low temperature flexibility tests herein employed are according to the Clash-Berg method. This method determines the torsional flexibility of a plastic at various temperatures. The temperature at which the vinyl composition exhibits an arbitrarily established minimum flexibility is defined as the low temperature flexibility of the composition. This value may also be defined as the lower temperature limit of the plasticized composition's usefulness as an elastomer.

*Volatility.*—Just as a decrease in low temperature often results in decreased flexibility of a plasticized polymer composition, so does a decrease in plasticizer concentration when caused by volatilization of the plasticizer. Hence, plasticizers which are readily volatilized from the plasticized composition as a result of aging or heating are inefficient because upon volatilization the plasticized compositions become stiff and hard. The test for plasticizer volatility herein employed is that described by the American Society for Testing Materials under the designation D–744–44T.

*Water resistance.*—The amount of water absorption and the amount of leaching that takes place when the plasticized composition is immersed in distilled water for 24 hours is determined.

The invention is further illustrated, but not limited, by the following examples:

*Example 1*

N-benzoylaspartic acid, M. P. 158° C., was prepared by the reaction of d,1-aspartic acid with benzoyl chloride in the presence of sodium hydroxide.

Bis(2-ethylhexyl) aspartate was prepared by refluxing a mixture consisting of 47.4 g. (0.2 mole) of the N-benzoylaspartic acid, 78 g. (0.6 mole) of 2-ethylhexanol, 170 ml. of benzene and 0.1 g. of 4-toluenesulfonic acid for 9 hours, diluting the resulting reaction mixture with ether, washing with aqueous sodium bicarbonate and distilling the resulting organic material to an oil bath temperature of 200–210° C./2–3 mm. There was thus obtained as distillation residue 84 g. (91.8% theoretical yield) of the substantially pure bis(2-ethylhexyl) aspartate, $n_D^{25}$ 1.4910, and analyzing 3.17% nitrogen (calcd. N for this ester, 3.04%). Testing of this aspartate as a polyvinyl chloride plasticizer is shown in Example 3.

*Example 2*

This example shows preparation of di-n-butyl aspartate.

A mixture consisting of 26.4 g. (0.12 mole) of the N-benzoylaspartic acid described in Example 1, 1.2 moles of n-butanol, 50 ml. of benzene and a trace of 4-toluenesulfonic acid was refluxed for 24 hours, while collecting water evolved in the esterification reaction. At the end of this time the reaction mixture was filtered to remove traces of undissolved material, and the filtrate was washed with 5 percent aqueous sodium carbonate and 3 percent sodium hydroxide. Distillation of the organic material thus obtained to remove the benzene and maintenance of the residue at 210° C. for 10 minutes gave 29.2 g. di-n-butyl N-benzoylaspartate, $n_D^{25}$ 1.4987, having a saponification equivalent of 173.5 as against 174.5, the calculated saponification equivalent for this ester.

The reaction of other alcohols of from 4 to 12 carbon atoms instead of n-butanol as in this example or 2-ethylhexanol as in Example 1, with N-benzoylaspartic acid may be effected similarly, e. g., with n-hexanol to give di-n-hexyl N-benzoylaspartate or with a tert-dodecyl alcohol to give di-tert-dodecyl N-benzoylaspartate. Also, instead of using N-benzoylaspartic acid, there may be employed an ar-alkyl substituted N-benzoylaspartic acid, such as N-4-toluylaspartic acid or N-(3-isopropylbenzoyl) aspartic acid.

*Example 3*

Sixty parts of polyvinyl chloride and 40 parts by weight of bis(2-ethylhexyl) N-benzoylaspartate were mixed on a rolling mill to a homogeneous blend. During the milling there was observed substantially no fuming and discoloration. A molded sheet of the mixture was clear and transparent and substantially colorless. Testing of the molded sheet for low temperature flexibility, according to the testing procedure described above, gives a value of minus 14.2° C. which value denotes good low temperature properties. Testing of the volatility characteristics of the plasticized composition gives a value of 1.7 percent, which value shows very good volatility properties. The plasticized material had a hardness of 81 before the volatility test and a hardness of 77 after the volatility test. When subjected to heat at a temperature of 325° F. for a period of 30 minutes the clarity and color of the molded product were substantially unchanged. Tests of the water-resistance properties of the plasticized material employing the test procedure described above showed a solids-loss of only 0.04 percent and an 0.80 percent water absorption value.

*Example 4*

Evaluation of di-n-butyl N-benzoylaspartate as a polyvinyl chloride plasticizer using the procedure of Example 3 gave a low temperature flexibility value of minus 12° C., a volatility value of 3.25%, a hardness of 78 before the volatility test and 75 after the volatility test, a solids loss value of 0.13 and a water absorption value of 0.47.

Instead of the esters employed in the example above, other dialkyl N-aroylaspartates having from 4 to 12 carbon atoms in the alkyl group may be used to give similarly valuable plasticized polyvinyl chloride compositions. Thus, by employing 40 parts by weight of di-n-octyl, di-isoamyl, di-n-hexyl or didecyl N-benzoylaspartate with 60 parts by weight of polyvinyl chloride or with 60 parts by weight of a vinyl chloride-vinyl acetate copolymer known to the trade as "Vinylite," there may be obtained clear colorless compositions of very good flexibility and stability.

While the above examples show only a composition in which the ratio of plasticizer to polymer content is 40:60, this ratio being employed in order to get comparable efficiencies, the content of ester to polyvinyl chloride may be widely varied, depending upon the properties desired in the final product. For many purposes a plasticizer content of, say, from ten percent to 20 percent is preferred. The present esters are compatible with polyvinyl chloride over a wide range of concentrations, up to 50 percent of esters based on the total weight of the plasticized composition yielding desirable products.

Although the invention has been described particularly with reference to the use of the present dialkyl N-benzoylaspartates as plasticizers for polyvinyl chloride, these esters may be advantageously employed also as plasticizers for copolymers of vinyl chloride, for example, the copolymers of vinyl chloride with vinyl acetate or vinylidene chloride. Preferably, such copolymers have a high vinyl chloride content, i. e., a vinyl chloride content of at least 70 percent by weight of vinyl chloride and up to 30 percent by weight of the copolymerizable monomer.

The plasticized polyvinyl halide compositions of the present invention have good thermal stability; however, for many purposes it may be advantageous to use known stabilizers in the plasticized compositions. Inasmuch as the present esters are substantially unreactive with the commercially available heat and light stabilizers which are commonly employed with polyvinyl chloride or copolymers thereof, the presence of such additives in the plasticized materials does not impair the valuable properties of the present esters. The present esters are of general utility in softening vinyl chloride polymers. They may be used as the only plasticizing component in a compounded vinyl chloride polymer or they may be used in conjunction with other plasticizers.

What I claim is:

1. A dialkyl N-benzoylaspartate in which the alkyl radical has from 4 to 12 carbon atoms.
2. Bis-(2-ethylhexyl) N-benzoylaspartate.
3. Di-n-butyl N-benzoylaspartate.

References Cited in the file of this patent
UNITED STATES PATENTS

| | | |
|---|---|---|
| 2,324,712 | Lynch | July 20, 1943 |
| 2,494,650 | Flett et al. | Jan. 17, 1950 |
| 2,516,955 | Butler | Aug. 1, 1950 |
| 2,522,393 | Milone | Sept. 12, 1950 |
| 2,560,617 | Weisblat et al. | June 17, 1951 |
| 2,666,040 | Best | Jan. 12, 1954 |

OTHER REFERENCES

Beilstein 9 (1926).